Patented May 16, 1939

2,158,290

UNITED STATES PATENT OFFICE 2,158,290

PROCESS OF PREPARING METHYL-VINYL-KETONE

Heinrich Lange and Otto Horn, Frankfort-on-the-Main-Hochst, Germany, assignors to I. G. Farbenindustrie Aktiengesellschaft, Frankfort-on-the-Main, Germany No Drawing. Application September 23, 1937, Serial No. 165,340. In Germany September 26, 1936

5 Claims. (Cl. 202—55)

The present invention relates to a process of preparing methyl-vinyl-ketone.

During the preparation of methyl-vinyl-ketone a part thereof is obtained in the form of an aqueous solution. Although the ketone is obtained in an aqueous solution in a relatively pure form, its separation from water involves great difficulties owing to its high solubility.

The vinyl-methyl-ketone could hitherto be recovered from its aqueous solution only by the complicated and uneconomical operation of salting it out with potassium carbonate. This process is very effective, but is open to the objection that, owing to the sensitivity of the vinyl-methyl-ketone to alkaline substances a considerable portion of the product undergoes polymerization and is lost.

Now we have found that the ketone may be separated from its aqueous solution rapidly and in a simple manner by conducting an aliphatic unsaturated gaseous hydrocarbon of at least three carbon atoms, for instance vinyl-acetylene, into the aqueous solution of the ketone. There is thus produced on the surface of the aqueous liquid a layer of a mixture of the ketone and the hydrocarbon, which may be separated from the aqueous layer by a separator, an overflow or the like, dried and distilled, for instance by way of a column, so as to separate the ketone from the hydrocarbon. It is thus possible to isolate the ketone in a technically simple manner and to avoid entirely losses due to the polymerization caused by alkaline agents. The hydrocarbon is suitably introduced at room temperature.

It is desirable that the hydrocarbons used for the separation should be soluble in water to a certain extent; because gases having too small a solubility do not promote the separation. Instead of a single hydrocarbon there may be used mixtures of hydrocarbons. The process may be conducted in a continuous manner.

The following examples serve to illustrate the invention, but they are not intended to limit it thereto, the parts being by weight:

1. 0.65 part of gaseous vinyl-acetylene is introduced, while stirring, into 10 parts of an aqueous solution of methyl-vinyl-ketone obtained in the course of the preparation of the ketone by the addition of water to vinyl-acetylene or during the steam distillation of the aqueous ketone solutions or the spent contacts. A mixture consisting of methyl-vinyl-ketone and vinyl-acetylene separates as an upper layer. This layer is separated and dried and the vinyl-methyl-ketone is isolated by distillation by way of a column. The unchanged vinyl-acetylene is recovered and may be used again in the process. It is thus possible to separate 65 to 75 per cent. of the total quantity of ketone dissolved in the water. The dilute aqueous solution is again subjected to steam distillation and the distillate enriched in the ketone is treated in the same manner with vinyl-acetylene.

2. 0.50 part of butadiene is introduced, while stirring, into 10 parts of an aqueous solution of methyl-vinyl-ketone. A mixture of methyl-vinyl-ketone and butadiene separates as an upper layer and may be separated into its constituents by distillation. 60 to 65 per cent. of the total quantity of ketone dissolved in the water may thus be separated.

3. 1 part of isobutylene is introduced, while stirring, into 10 parts of an aqueous solution of vinyl-methyl-ketone. A mixture of vinyl-methyl-ketone and isobutylene separates as an upper layer. This mixture may be separated as described in Example 1. The yield amounts to 70 per cent. of the quantity of ketone dissolved in the water.

4. 0.8 part of propylene is introduced, while stirring, into 10 parts of an aqueous solution of vinyl-methyl-ketone. A mixture of vinyl-methyl-ketone and propylene separates as an upper layer and may be separated as described in Example 1. The yield amounts to 65 per cent. of the quantity of ketone dissolved in the water.

We claim:

1. The process which comprises conducting an aliphatic unsaturated gaseous hydrocarbon of at least three carbon atoms into an aqueous solution of vinyl-methyl-ketone until two layers are formed and separating the layer containing the vinyl-methyl-ketone from the aqueous layer.

2. The process which comprises conducting an aliphatic unsaturated gaseous hydrocarbon of at least three carbon atoms into an aqueous solution of vinyl-methyl-ketone until two layers are formed, separating the layer containing the vinyl-methyl-ketone from the aqueous layer and isolating the vinyl-methyl-ketone by fractional distillation.

3. The process which comprises conducting vinyl-acetylene into an aqueous solution of vinyl-methyl-ketone until two layers are formed, separating the layer containing the vinyl-methyl-ketone from the aqueous layer and isolating the vinyl-methyl-ketone by fractional disillation.

4. The process which comprises conducting butadiene into an aqueous solution of vinyl-methyl-ketone until two layers are formed, separating the layer containing the vinyl-methyl-ketone from the aqueous layer and isolating the vinyl-methyl-ketone by fractional distillation.

5. The process which comprises conducting isobutylene into an aqueous solution of vinyl-methyl-ketone until two layers are formed, separating the layer containing the vinyl-methyl-ketone from the aqueous layer and isolating the vinyl-methyl-ketone by fractional distillation.

HEINRICH LANGE.
OTTO HORN.